United States Patent [19]

Lakshmanan

[11] Patent Number: 5,290,525
[45] Date of Patent: Mar. 1, 1994

[54] REMOVAL OF BASE METALS AND CYANIDE FROM GOLD-BARREN CIP SOLUTIONS

[75] Inventor: Vaikuntam I. Lakshmanan, Mississauga, Canada

[73] Assignee: Ortech Corporation, Mississauga, Canada

[21] Appl. No.: 945,018

[22] Filed: Sep. 14, 1992

Related U.S. Application Data

[63] Continuation of Ser. No. 674,677, Mar. 25, 1991, abandoned.

[30] Foreign Application Priority Data

Mar. 30, 1990 [GB] United Kingdom ............... 9007122

[51] Int. Cl.$^5$ .................. C01G 49/00; C01G 9/00; C01G 3/00
[52] U.S. Cl. ................... 423/24; 423/100; 423/138; 423/371
[58] Field of Search ............ 423/29, 24, 100, 371, 423/139; 210/678, 677, 670, 638

[56] References Cited

U.S. PATENT DOCUMENTS

| 3,656,893 | 4/1972 | Sloan | 423/24 |
| 3,984,314 | 11/1976 | Fries | 210/670 |
| 4,267,159 | 5/1981 | Crits | 423/371 |
| 4,321,145 | 3/1982 | Carlson | 210/678 |
| 4,708,804 | 11/1987 | Coltrinari | 210/677 |
| 4,732,609 | 3/1988 | Frey et al. | 423/29 |
| 4,895,659 | 1/1990 | Semmens et al. | 210/638 |

FOREIGN PATENT DOCUMENTS

47-10959  3/1972  Japan ............... 210/904

*Primary Examiner*—David Brunsman
*Attorney, Agent, or Firm*—Bell, Seltzer, Park & Gibson

[57] ABSTRACT

Processes are provided for substantially removing base metals and/or cyanide from gold-barren solutions resulting from gold ore processing.

5 Claims, No Drawings

REMOVAL OF BASE METALS AND CYANIDE FROM GOLD-BARREN CIP SOLUTIONS

This is a continuation of Ser. No. 07/674,677, now abandoned, filed 25 Mar. 1991.

FIELD OF INVENTION

This invention relates to processes for removing and recovering base metals and cyanide during gold-recovery processes.

BACKGROUND OF THE INVENTION

The standard method for recovering gold from its ores involves leaching the finely ground ore with alkaline cyanide solution to dissolve the gold. Depending on the ore being cyanided, varying amounts of metals such as copper and iron are also dissolved in the cyanide solution. After the cyanidation step, various processing methods are available.

Of particular use in treating ores with a high clay content, or which generate large amounts of slimes during grinding, is the Carbon-In-Pulp (CIP) process. In this process, activated carbon is added to the cyanide-ore slurry after leaching is complete. The carbon-containing slurry is agitated for several hours, allowing adsorption of the dissolved gold by the activated carbon, which is then separated from the mixture.

The carbon-in-pulp procedure removes only the gold, leaving the other metals and the cyanide in solution in the liquid phase.

This gold-barren solution has to be returned to the milling circuit, or has to be disposed of. Solutions with a high metal content cannot be returned to the milling circuit because of "fouling", which will lead to high cyanide consumption and lower gold recovery (dissolution) and their disposal is limited by environmental regulations.

A variation of CIP is the Carbon-In-Leach (CIL) process, in which cyanide leaching and carbon adsorption are carried out simultaneously.

The gold-containing carbon is separated from the slurry and the gold is stripped from the carbon by conventional methods. The residual gold-barren slurry has traditionally been discarded into tailing ponds. The gold-barren slurry contains cyanide and also varying amounts of base metals such as copper and iron, present as cyano complexes; these substances find their way into the deposited tailings.

Widespread concerns about environmental contamination and the resultant increasingly stringent government regulations with respect to permissible levels of substances such as base metals and cyanide in dumped material make disposal of such tailings increasingly difficult.

If one attempts to reduce the metal loading of the tailings by causing release of metals such as Cu and Fe into the pond water which is decanted back into the milling circuit, these metals accumulate and are adsorbed by the activated carbon, finding their way eventually into the final gold product at greater than acceptable levels.

There is a need for convenient methods of removing and recovering base metals and cyanide from the gold-barren solutions.

SUMMARY OF THE INVENTION

In accordance with one aspect of the invention, a process is provided for substantially removing base metals from gold-barren cyanide leachate comprising contacting the leachate with a suitably conditioned strong base anion exchange resin for a sufficient time to remove the base metals followed by separation of said leachate from the resin.

In accordance with a further aspect of the invention, a process is provided for substantially removing base metals from gold-barren cyanide leachate without removal of cyanide from the leachate comprising contacting the leachate with a suitably conditioned strong base anion exchange resin for a sufficient time to remove the base metals followed by separation of the leachate from the resin.

In accordance with a further aspect of the invention, a process is provided for substantially removing at least one selected base metal from gold-barren cyanide leachate comprising contacting the leachate with a suitably conditioned strong base anion exchange resin for a sufficient time to remove the selected base metal followed by separation of the leachate from the resin.

DETAILED DESCRIPTION OF THE INVENTION

The present invention provides convenient and economic methods for substantially removing base metals from the solution remaining when gold is extracted from ore using cyanide extraction.

After leaching of the ore with alkaline cyanide solution, both the gold and base metals such as copper and iron are present as anionic cyano complexes.

After removal of the gold complexes, for example by CIP and CIL techniques, the leachate referred to herein as "gold-barren cyanide leachate", poses a disposal problem due to its content of base metals and cyanide.

The present invention provides a method for removing base metals and cyanide together from the leachate or, if it is desired to conserve and reuse the cyanide, a method for removing base metals from the leachate without removal of the cyanide. In the latter case, the treated leachate can be returned to the milling circuit to conserve cyanide without increasing the load of base metals in the circuit to undesirable levels.

The gold-barren cyanide leachate is treated, in accordance with the invention, by contacting it with a suitably conditioned strong base anion exchange resin which removes base metals from the leachate.

The gold-barren leachate can be contacted with the conditioned resin by counter-current techniques which are well known in the ore-processing industry or by other suitable methods known to those skilled in the art. Techniques suitable for separation of the treated leachate from the resin are also well known to those skilled in the art, for example, by filtration.

Surprisingly, it has been found that suitably conditioned strong base resins have a sufficiently high capacity for removal of base metals from the gold-barren leachate that these metals are substantially removed by relatively short exposures of the leachate to the resin.

The optimum time of contact between the leachate and conditioned resin can be readily determined by analysis of the metal content of samples of leachate after various times of contact, by methods well known to those skilled in the art.

In accordance with one embodiment of the invention, a strong base anion exchange resin is conditioned by treatment with a mineral acid, hydrochloric acid being preferred. When the gold-barren cyanide leachate is contacted with this resin, base metals, including copper, iron and zinc are substantially removed, as well as part of the cyanide in the leachate.

In accordance with a further embodiment of the invention, a strong base anionic exchange resin is conditioned by treatment with a solution of a cyanide salt, for example, sodium cyanide.

When the gold-barren leachate is contacted with such a conditioned resin, base metals including copper, iron and zinc are substantially removed without any loss of cyanide from the leachate. The treated leachate can be returned to the milling circuit to economise on cyanide without undesirable base metal build up. This provides for an improved water recycling regime within the mill without compromising product quality.

In accordance with a further embodiment of the invention, a strong base anionic exchange resin is conditioned by treatment with a solution of a metal cyano complex of greater anionic volume than that of the cyano complex of a selected base metal to be removed from the gold-barren leachate. When the leachate is contacted with the conditioned resin, the cyano complex of greater anionic volume is displaced from the resin by the cyano complex of the selected metal, which is removed from the leachate. For example, if the resin is conditioned by treatment with a solution of $Cu(CN)_4^{2-}$, and a gold-barren leachate containing copper, iron and zinc is contacted with such a conditioned resin, iron and zinc are selectively removed from the leachate.

It is believed that the exchange occurs in accordance with the following equation, wherein |— represents the resin matrix

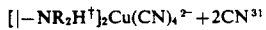

$Cu(CN)_4^{2-}$ may be prepared, for example, by adding $CuSO_4 \cdot 5H_2O$ as a salt to a 5% solution of NaCN with NaOH to provide a pH of 10.5.

After metal loading, the resin may be restored by treatment with sulphuric acid to produce sulphates of the removed metals, along with HCN gas which can be collected in scrubbers. The metal sulphates may be treated with lime to produce hydroxides which, being readily broken down, can be readily converted to environmentally acceptable metal-containing compounds.

EXAMPLE 1

Gold-barren CIP solution was obtained from a gold-mine and analysed in duplicate by conventional techniques for its content of gold(Au), Copper(Cu), iron(Fe), zinc(Zn), thio cyanate (CNS) and sodium cyanide(NaCN), with the results shown in Table 1.

TABLE 1

| Element | Mean value (ppm) |
| --- | --- |
| Au | 0.02 |
| Cu | 214 |
| Fe | 40 |
| Zn | 1.8 |
| CNS | 325 |

TABLE 1-continued

| Element | Mean value (ppm) |
| --- | --- |
| NaCN | 425 |

EXAMPLE 2

Amberlite* IRA-402 resin was obtained from Rohm and Haas Company, Philadelphia, Pa. This resin is a strong base anion exchange resin with quaternary ammonium functional groups.

*a trade-mark

The resin was conditioned with various conditioning agents as follows:

(a) HCl Conditioning

One bedvolume of resin was conditioned with ten bedvolumes of 10% HCl (37%) for 15 min. Conditioned resin was washed with distilled $H_2O$.

(b) NaCN Conditioning

One bedvolume of resin was conditioned with ten bedvolumes of 5% NaCN weight/volume solution for 15 minutes. The conditioned resin was washed with distilled $H_2O$.

EXAMPLE 3

The gold-barren CIP solution of Example 1 was treated with Amberlite IRA-402 resin conditioned with HCl as in Example 2. The treatment was carried out in a stir tank with magnetic agitation. 200 ml of CIP solution was treated with 10 ml wet settled resin (WSR) for 15 minutes.

The treated solution was analysed and the results are shown in Table 2.

TABLE 2

| | Cu | Fe (ppm) | NaCN |
| --- | --- | --- | --- |
| Solution before adsorption | 214 | 40 | 425 |
| Solution after adsorption | <0.3 | <0.2 | 200 |

The copper- and iron-containing cyano complexes of the gold-barren leachate, $CU(CN)_4^{2-}$ and $Fe(CN)_6^{2-}$, replace Cl— in the resin and are almost completely removed from the solution. Some cyanide anion also exchanges with Cl—.

EXAMPLE 4

The gold-barren CIP solution of Example 1 was treated with Amberlite IRA-402 resin conditioned with NaCN as described in Example 2. Treatment was carried out as in Example 3, and the results are shown in Table 3.

TABLE 3

| | NaCN | Cu | Fe (ppm) |
| --- | --- | --- | --- |
| Solution before adsorption | 214 | 40 | 425 |
| Solution after adsorption | <0.3 | <0.2 | 1500 |

When the resin is conditioned with NaCN, the copper- and iron-containing cyano complexes of the gold-barren leachate are almost completely removed, being exchanged for cyanide anion.

The cyanide anion of the gold-processing liquor is not lost along with the base metal complexes as it cannot be taken up by the cyanide-conditioned resin. The cyanide content of the treated liquor is actually increased, possibly due to release of cyanide ions from the resin in exchange for anionic complexes, and the cyanide may be conserved by returning the treated liquor to the mill.

The weak base anion exchange resin, PAZ-4 (Sela, N.Y.) when conditioned similarly to IRA-402, as described above, and contacted with gold-barren cyanide leachate, failed to remove iron and zinc from the leachate.

EXAMPLE 5

Loading capacity of the resin Amberlite IRA-402 was examined. The resin was conditioned with NaCN as in Example 2 and 42 ml resin was packed in a 1 cm diameter column. The gold-barren CIP solution of Example 1 was passed through the column at a flow rate of 15L/hr per liter WSR until the upper part of the resin was loaded to 20g/L WSR Cu.

The effluent was analysed and the results are set out in Table 5.

TABLE 5

| Volume L per L WSR | Cu ppm | Effluent Fe ppm | NaCN ppm |
|---|---|---|---|
| 10 | <0.3 | <0.2 | 1500 |
| 20 | 2.1 | <0.2 | 1430 |
| 30 | 9.8 | <0.2 | 1400 |
| 40 | <0.3 | <0.2 | 1350 |

TABLE 5-continued

| Volume L per L WSR | Cu ppm | Effluent Fe ppm | NaCN ppm |
|---|---|---|---|
| 50 | <0.3 | <0.2 | 700 |

It can be seen that the loading capacity of the resin had not been exceeded when the test was terminated, showing the very high loading capacity for removal of base metals from gold-processing liquors.

Although only preferred embodiments of the invention have been described and illustrated, the present invention is not limited to the features of these embodiments, but includes all variations and modifications within the scope of the claims.

I claim:

1. A process for substantially removing base metals from gold-barren cyanide leachate comprising contacting said leachate with a strong base anion exchange resin conditioned by treatment with a solution with a cyanide salt for a sufficient time to remove said base metals followed by separation of said leachate from said resin.

2. A process in accordance with claim 1 wherein said solution of cyanide salt is a 5% solution of NaCN and said base metals are copper, iron and zinc.

3. A process in accordance with claim 2 wherein said leachate is contacted with said resin by a counter-current technique.

4. A process for substantially removing at least one selected base metal from gold-barren cyanide leachate comprising contacting said leachate with a strong base anion exchange resin conditioned by treating it with a solution of a metal cyano complex of greater anionic volume than the cyano complex of said selected base metal for a sufficient time to remove said selected base metal followed by separation of said leachate from said resin.

5. A process in accordance with claim 4 wherein said resin is conditioned by treating it with a solution of $Cu(CN)_4^{2-}$ and said selected base metal is iron or zinc.

* * * * *

UNITED STATES PATENT AND TRADEMARK OFFICE
CERTIFICATE OF CORRECTION

PATENT NO. : 5,290,525
DATED : March 1, 1994
INVENTOR(S) : Lakshamanan

It is certified that error appears in the above-indentified patent and that said Letters Patent is hereby corrected as shown below:

Title page, item [56], References, "11/1976" should be -- 10/1976 --.

Column 3, line 40, "$Cu(CN_4{}^{2-}$" should be -- $Cu(CN)_4{}^{2-}$ --.

Column 4, lines 49 and 51, "Cl-" should be -- $Cl^-$ -- .

Signed and Sealed this

Thirtieth Day of August, 1994

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,290,525
DATED : March 1, 1994
INVENTOR(S) : Lakshamanan

It is certified that error appears in the above-identified patent and that said Letters Patent is hereby corrected as shown below:

On the cover page - Foreign Patent Documents, add --
1597283 9/1981 United Kingdom --.

Column 3, line 42, "$2CN^{31}$" should be -- $2CN^-$ --.

Signed and Sealed this

Seventh Day of April, 1998

Attest:

Attesting Officer

BRUCE LEHMAN

Commissioner of Patents and Trademarks